E. L. & W. S. SHARPNECK.
JOURNAL BEARING.
APPLICATION FILED MAY 21, 1908.

924,843.

Patented June 15, 1909.

Witnesses
C. E. Hunt
C. H. Griesbauer

Inventors
E. L. Sharpneck
W. S. Sharpneck
By H. B. Willson & Co.
Attorneys

UNITED STATES PATENT OFFICE.

ELIEL L. SHARPNECK AND WILLIAM S. SHARPNECK, OF BOSTON, MASSACHUSETTS.

JOURNAL-BEARING.

No. 924,843.   Specification of Letters Patent.   Patented June 15, 1909.

Application filed May 21, 1908. Serial No. 434,118.

*To all whom it may concern:*

Be it known that we, ELIEL L. SHARPNECK, and WILLIAM S. SHARPNECK, citizens of the United States, residing at Boston, in the county of Suffolk and State of Massachusetts, have invented certain new and useful Improvements in Journal-Bearings; and we do declare the following to be a full, clear, and exact description of the invention, such as will enable others skilled in the art to which it appertains to make and use the same.

Our invention relates to certain improvements in journal bearings.

It has for its object to prolong the life of the brass or bearing; to collect the waste lubricant for utilization; and to effect these objects in a simple, expeditious and preferable manner.

With these and other objects in view, the invention consists of certain novel features of construction, combination and arrangement of parts as will be described and particularly pointed out in the appended claim.

Figure 1:
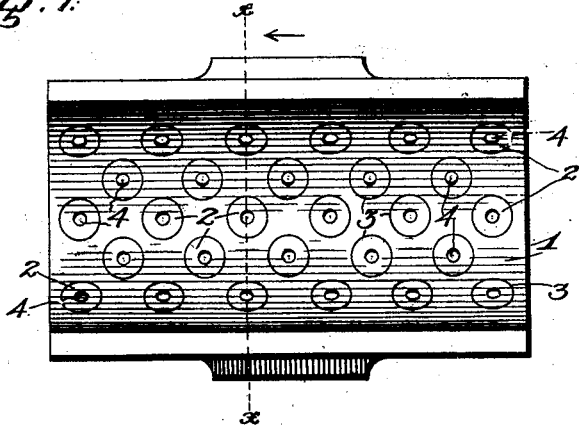
Figure 2:
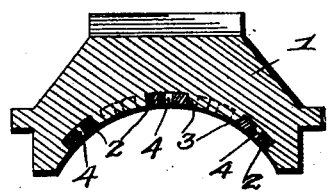
Figure 3:
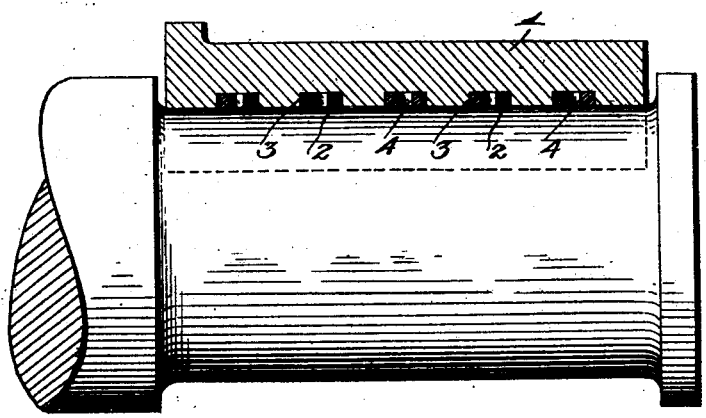

In the accompanying drawing, illustrating the preferred embodiment of our invention, Figure 1 is an inverted plan view of the brass or bearing; Fig. 2 is a transverse sectional view produced on the line x—x of Fig. 1; and Fig. 3 is a longitudinal sectional view.

In carrying out our invention, we provide the usual brass, 1, with numerous disks or blocks, 2, preferably of rawhide, for its lasting quality, let into corresponding recesses or sockets, 3, formed in the concave surface of the brass with their bearing surfaces arranged flush with the corresponding surface of the brass. Said disks or blocks are provided with central passages or openings, as 4, the purpose of which is to collect superfluous lubricant which may accumulate on the journal as the latter rotates, and to retain and apply said lubricant to the journal when necessary, as in the irregular feeding of the lubricant to the journal. Said blocks or disks, it will be noted, are arranged in diagonal lines in the bearing surface of the brass to provide for the complete contact of the journal therewith in each revolution of the latter, the advantages of which are obvious.

It will be noted by the employment of rawhide in making the disks or blocks herein described, that it will aid, by reason of its great lasting quality, in the prolongation of the wearing action of the brass, as is well understood.

From the foregoing arrangement of parts, it will be noted our invention is characterized by great simplicity, economy of manufacture, as well as readily adapted to be applied for use.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described our invention, what we claim as new and desire to secure by Letters-Patent, is:

A journal bearing brass, a series of blocks or disks formed of rawhide and set into said brass, each of said disks having formed therein an oil-collecting and retaining passage whereby superfluous oil is collected from the journal and retained for future application thereto.

In testimony whereof we have hereunto set our hands in presence of two subscribing witnesses.

ELIEL L. SHARPNECK.
WILLIAM S. SHARPNECK.

Witnesses:
WILLIAM REDING,
FRANK E. BARNARD.